(12) United States Patent
Killer et al.

(10) Patent No.: US 7,261,500 B2
(45) Date of Patent: Aug. 28, 2007

(54) METHOD AND APPARATUS FOR MACHINING A BLANK FROM ALL DIRECTIONS IN A MACHINE TOOL OR MILLING MACHINE

(75) Inventors: Franz Killer, Gansingen (CH); Josef Scherer, Frankfurt (DE)

(73) Assignee: ALSTOM Technology Ltd, Baden (CH)

( * ) Notice: Subject to any disclaimer, the term of this patent is extended or adjusted under 35 U.S.C. 154(b) by 34 days.

(21) Appl. No.: 10/902,117

(22) Filed: Jul. 30, 2004
(Under 37 CFR 1.47)

(65) Prior Publication Data
US 2005/0186045 A1 Aug. 25, 2005

Related U.S. Application Data

(63) Continuation of application No. PCT/CH03/00059, filed on Jan. 24, 2003.

(30) Foreign Application Priority Data
Jan. 31, 2002 (CH) .................................... 0169/02

(51) Int. Cl.
*B23C 3/18* (2006.01)
(52) U.S. Cl. .................... 409/132; 29/889.7; 409/163; 409/197; 409/225; 409/242; 409/199
(58) Field of Classification Search ............... 409/131, 409/132, 158, 163, 133, 172, 174, 189, 197, 409/219, 225, 242, 198, 199, 165, 159, 202; 82/129; 29/889.7
See application file for complete search history.

(56) References Cited

U.S. PATENT DOCUMENTS

| 3,262,368 | A | * | 7/1966 | Attermeyer et al. | ......... 409/167 |
| 3,884,122 | A | * | 5/1975 | Chernov et al. | ............ 409/167 |
| 4,597,155 | A | * | 7/1986 | Garnett et al. | ................ 29/564 |
| 4,730,382 | A | * | 3/1988 | Parsons | ........................ 29/563 |
| 4,782,567 | A | * | 11/1988 | Kanaya et al. | ............... 29/33 P |
| 5,062,195 | A | | 11/1991 | Binder | ........................ 29/568 |
| 5,678,291 | A | * | 10/1997 | Braun | ........................ 22/26 A |
| 5,704,262 | A | * | 1/1998 | Baumbusch et al. | .......... 82/124 |
| 5,964,016 | A | | 10/1999 | Ito et al. | ..................... 29/27 C |
| 7,112,017 | B2 | * | 9/2006 | Killer et al. | ................ 409/132 |
| 2002/0014006 | A1 | | 2/2002 | Brock | |
| 2004/0129120 | A1 | | 7/2004 | Grossmann | |
| 2006/0137169 | A1 | * | 6/2006 | Boehm et al. | ................ 29/557 |

FOREIGN PATENT DOCUMENTS

CH          686 878 A5     7/1996

(Continued)

*Primary Examiner*—Daniel W. Howell
(74) *Attorney, Agent, or Firm*—Steptoe & Johnson LLP (57) ABSTRACT

The corresponding machine tool or milling machine for carrying out the method described has a milling spindle which is displaceable in three spatial directions and with which the workpiece can be machined in a machining region, the machine tool or milling machine having at least one mounting slide, with which the workpiece, for the first machining step, can be mounted in gripping adapters. Furthermore, the machine tool or milling machine has at least one rocker, with which the partly machined workpiece can be mounted by means of at least one special gripping adapter in the first, finally machined region of the workpiece for the second machining step.

39 Claims, 7 Drawing Sheets

FOREIGN PATENT DOCUMENTS

| | | |
|---|---|---|
| DE | 38 24 602 A1 | 1/1990 |
| DE | 44 01 212 C1 | 3/1995 |
| DE | 44 30 113 A1 | 2/1996 |
| DE | 199 48 139 A1 | 4/2001 |
| DE | 100 35 224 A1 | 1/2002 |
| DE | 101 16 994 A1 | 10/2002 |
| EP | 0 411 446 A1 | 2/1991 |
| EP | 0 659 520 A1 | 6/1995 |
| EP | 0 827 807 A1 | 3/1998 |
| JP | 57015609 A * | 1/1982 |
| JP | 63-200937 | 8/1988 |
| JP | 07299628 A * | 11/1995 |
| WO | WO 03/064088 A1 | 8/2003 |

* cited by examiner

METHOD AND APPARATUS FOR MACHINING A BLANK FROM ALL DIRECTIONS IN A MACHINE TOOL OR MILLING MACHINE

CROSS-REFERENCE TO RELATED APPLICATIONS

This application is a continuation of the U.S. National Stage designation of co-pending International Patent Application PCT/CH03/00059 filed Jan. 24, 2003, the entire content of which is expressly incorporated herein by reference thereto.

FIELD OF THE INVENTION

The present invention relates to a method of machining blanks or pre-machined workpieces from all directions using a machine tool, such as a milling machine for example, to produce components that are finally machined in their three-dimensional shape and to a machine tool, such as a milling machine for example, for carrying out such a method.

BACKGROUND OF THE INVENTION

During the production of turbine blades, work is normally carried out with multi-spindle machining. This means that a blank is first of all subjected to rough pre-machining, then the airfoil region is processed in detail, and then the tip and finally the root are produced. Between these individual machining steps, the workpiece must be reset in each case by hand or by a robot; this is because the milling machines are often only able to carry out individual machining steps, and in particular because each mounting of the workpiece always only allows the machining of a certain region. This type of production is normally referred to as "box production", since in each case one machine is normally responsible for a certain machining step, and because the workpiece can be temporarily stored in a box after each machining step.

A problem with such production is, inter alia, the fact that the speed of such a production line is always determined by the speed of the slowest machining step. In addition, the multiplicity of processes for the transfer of workpieces between the individual units, such as milling machines, measuring station, washing station, etc., requires complicated devices and leads to considerable time losses in the production process.

SUMMARY OF THE INVENTION

The invention therefore relates to providing a method and an apparatus for machining a blank from all directions using a single machine tool, such as a milling machine for example, which method makes possible the production of the ready-to-use component in as few machining steps and setups as possible. In this case, the machine tool is able to carry out different operations such as milling, drilling, turning and/or electrical discharge machining, etc. In this context, the expression "milling machine" is therefore to be given a wide interpretation, i.e. it relates to machine tools that are not only able to carry out milling operations but if need be can also carry out turning, drilling, electrical discharge machining, grinding, hardening operations, etc.

In the present invention, the blank, in a first machining step, is held by at least one gripping adapter and by a first region being given its final partial shape corresponding to the intended use by the machine tool/milling machine, and, in a second machining step, by the partly machined blank then being held by at least one special gripping adapter in the first, finally machined region, and by the remaining region being given its final overall shape corresponding to the intended use by the same machine tool/milling machine.

The invention consists in mounting the blank in the first step, for the machining, or in fastening it in the machining space of the machine tool or milling machine by means of an adapter, in such a way that that region of the workpiece that is not concealed as a result of the fastening by the adapter or is not inaccessible as a result of the machining by the machine tool or milling machine is already machined in the first machining step into its final three-dimensional shape corresponding to the intended use. Consequently, this enables the workpiece, for further machining, to be fastened by means of a further special gripping adapter that grips the workpiece in certain, already finally machined zones and which is movably mounted on the same base unit of the machine tool or milling machine. Of course, the fastening in this case must take place in such a way that the entire region of the partly machined blank which is still unmachined is accessible in an unrestricted manner for the final further machining by the same machine tool or milling machine. It is thus then possible in the second machining step, on the same machine tool or milling machine, without further resetting, for the partly machined blank to finally be given its overall three-dimensional shape.

This is quite surprising, for the individual machining steps comprise milling operations and also, inter alia, roughing and finishing, which exert considerable forces on the workpiece and which have hitherto always prevented the person skilled in the art from giving the workpiece its final shape in only two setups on a single machine. Normally, it has always been assumed that the forces produced during the machining lead either to damage to the workpiece or to inadequate quality of the final workpiece (e.g. as a result of vibrations, moments, etc.). However, it has been found that it is possible, in a first machining step, to already give functional surfaces their final shape and to immediately use precisely these functional surfaces for the mounting for the second machining step, and to carry out the second machining step using the same machine tool or milling machine.

The reduction in setups and the use of only one machine tool or milling machine leads to a considerable simplification in the production process and to cost savings (less downtime, fewer means for the transfer of components, fewer milling machines, etc.) and nonetheless permits the production of final shapes which meet the highest quality requirements. The direct transfer from the adapter for the first machining step to the special gripping adapter for the second machining step without the use of a robot permits, in an especially simple, defined manner, the transfer from one setup to the next, which leads to a reduction in the requisite adjustments. In this context, "defined manner" means that the means for removing the partly machined workpiece, i.e. the special gripping adapters, grip this workpiece at a well-defined location, so that the partly machined workpiece can then be finish-machined in a likewise well-defined position in the second machining step. The effective configuration of the special gripping adapter (spacing and type of mounting points) therefore depends as a rule on the contour of the partly machined region of the workpiece.

The overall shape which is in accordance with the intended use and which can be achieved with the method according to the invention involves any desired component which can be obtained from a blank by the abovementioned operations. The method is especially suitable for the production of components as used in a turbine (steam turbine or gas turbine). Thus the component is preferably a moving or guide blade of a turbine.

According to a first preferred embodiment of the invention, the blank is a blank made of metal or a ceramic material in the form of a rectangular or cylindrical or polyhedral, in particular preferably parallelepiped-shaped, block or is a cast blank or forged blank. It is likewise possible to feed the blank to the method according to the invention in an already pre-machined form. Surprisingly, the method according to the invention is also successful with such difficult-to-machine components, and this without loss of quality of the final shaped parts.

According to a further preferred embodiment of the invention, the partial shape is a shape leaving unmachined projecting portions at the tip part and at the root part, recesses being provided between the projecting portions and the partial shape in particular preferably during the first machining step. The proposed method proves to be suitable, for example, for producing guide or moving blades or turbine blades, the partial shape in this case involving the tip of the blade, the airfoil region of the blade and the root of the blade, and projecting portions gripped by the gripping adapter being left at the tip and at the root after the first machining step, these projecting portions then being removed in the second machining step.

According to a further preferred embodiment of the invention, the workpiece, in both machining steps, is machined by a single milling spindle displaceable in three spatial directions (x, y, z) and carrying a rotatable spindle for mounting a cutting tool.

In particular in the case of large blanks, it proves to be advantageous to provide not only one but two gripping adapters, between which the workpiece is clamped in place. Accordingly, according to another preferred embodiment of the invention, the workpiece, in the first machining step, is held in two gripping adapters gripping the blank at the tip and the root, and the first region is processed in the exposed region between the two gripping adapters, the gripping adapters preferably being guided by two mounting slides in such a way that the workpiece, with respect to a milling spindle machining the workpiece, can be displaced along a first axis and rotated about this first axis. The rotatability of the workpiece about the first axis has the advantage that the workpiece can also be subjected to a turning operation by the milling spindle. The displaceability along this first axis enables high relative speeds of cutting tool and workpiece while milling spindle and mounting slides are simultaneously displaced in opposite directions, without the workpiece or the cutting tool having to be displaced on its own at correspondingly higher speed.

With regard to the rotatability about this first axis, this rotatability can in particular preferably be configured for the two gripping adapters independently of one another. This means that the two gripping adapters on the mounting slides can be activated with different speeds and in opposite directions or in the same direction. The advantage of such independent rotatability of the two gripping adapters, which basically proves to be virtually unexpected, and independently of the present method, is due to the fact that the workpiece, after it has been gripped from both sides by the gripping adapters, can be restrained by slight contra-rotation of the two gripping adapters, which leads to better mounting of the workpiece in the gripping adapters. This restraining state can be recorded electronically and maintained during the entire further first machining step, or else if need be can also be corrected subsequently or increased. The torsion accordingly applied to the workpiece can be taken into account and corrected in the program for the electronic control of the milling spindle.

In order to also permit in a simple manner the second machining step in the same machine tool or milling machine while using the same milling spindle, according to a further exemplary embodiment of the present invention, after the first machining step with the milling spindle, the partly machined blank is automatically gripped by at least one special gripping adapter in the first, finally machined region, that is to say no robot is required for the resetting. The at least one gripping adapter is then released and moved out of the working region of the milling spindle in order not to get in the way during the second machining step. The partly machined blank, while being mounted in the special gripping adapter, is then given its final overall shape corresponding to the intended use by means of the same milling spindle, i.e. the projecting portions which had served for mounting in the adapters during the first machining step are now removed in the second machining step and, for example in the case of a turbine blade, the tip and root parts are given the final shape. In this case, it proves to be advantageous to fasten the at least one special gripping adapter to at least one rocker which is rotatable about a second axis and which in turn is arranged on a rocker slide unit, which is displaceable along a third axis and is mounted so as to be rotatable about this third axis, the rocker if need be also being displaceable perpendicularly to this third axis. A rocker of such a design, on the one hand, permits the direct automated resetting from the adapter for the first machining step to the special gripping adapter for the second machining step, and, on the other hand, due to its movability, it enables the second machining step to be carried out by the same milling spindle, since the rocker is able to mount the partly machined workpiece in a movable manner in the machining region of the milling spindle. The intermediate step normally present—the transfer of the workpiece by means of a robot from one mounting into a second—is thus completely dispensed with. As is already the case with the mounting in the adapters during the first machining step, the rotatability of the rocker about the second axis, while using two rockers, can also be adjustable independently of one another in an advantageous manner, so that, for the second machining step too, the workpiece can be restrained and effectively fixed by slight contra-rotation of the two rockers relative to one another.

According to another preferred embodiment of the invention, the final overall shape can be cleaned and/or measured after the first and/or the second machining step and/or can be packed after the second machining step. The corresponding means for carrying out these steps, which in addition may also comprise the provision of a material or component material code, can be either carried out on the same machine tool or milling machine or else can be realized in a downstream step on other units. It is likewise possible, before the machining, to channel the blank through a material-code-reading station, which can be designed either separately or as part of the machine tool or milling machine. This material-code-reading station serves to assign a certain NC program for controlling the machining process.

The present invention proves to be especially suitable for the production of guide or moving blades or of turbine blades with or without shroud band. In particular in the production of large components of this kind having a surface within the range of N4 to N5 at tolerances of +/−0.002 mm, a length within a range of 120 to 2400 mm with a rotating diameter of 50 to 400 mm and a weight of 10 to 400 kg, the present method can be used in a single machine tool or milling machine without stability problems (despite large moment arms) or accessibility problems for the machining head occurring in the process.

Further preferred embodiments of the method according to the invention are described in the dependent claims.

As already mentioned at the beginning, the present invention also relates to a machine tool or milling machine for carrying out the method as described above. This machine tool or milling machine is characterized in that it has a milling spindle which is displaceable in three spatial directions and with which the workpiece can be machined in a machining region, in that the machine tool or milling machine has at least one mounting slide, with which the workpiece, for the first machining step, can be mounted in gripping adapters, and in that, furthermore, the machine tool or milling machine has at least one rocker, with which the partly machined workpiece can be mounted by means of at least one special gripping adapter in the first, finally machined region of the workpiece for the second machining step. In this case, the milling spindle is advantageously arranged on the one side of the mounting slides, whereas the rocker is advantageously arranged on the other side of the mounting slides. Thus, the at least one mounting slide, during the machining with mounting in the rocker in the second machining step, can be moved in a simple manner out of the machining region of the milling spindle.

In this case, the milling spindle typically has a base slide unit displaceable in the X direction on rear guideways arranged on the base frame, a Y slide unit displaceable on this base slide unit in the Y direction, and a Z slide unit displaceable on the Y slide unit in the Z direction, and also a UNI spindle rotatable about a rotary axis in the Z slide unit and carrying the cutting tool. In this case, for the machining in particular of blades of the size specified above, it should be possible for the milling spindle to be displaced in the X direction by +/−1000 to 1200 mm and in the Y direction by +/−300 to 350 mm and in the Z direction by +900 to 1000 and −90 to 110 mm, relative to the zero point of the machine arrangement, the UNI spindle in particular preferably being rotatable by +/−90 to 100 degrees about the rotary axis.

According to another preferred embodiment of the machine tool or milling machine according to the invention, two mounting slides are arranged which hold the workpiece in the first machining step in two gripping adapters gripping the blank at the tip and the root. In this case, the gripping adapters are preferably guided by the two mounting slides in such a way that the workpiece, with respect to the milling spindle machining the workpiece, can be displaced along a first axis and rotated about this first axis, and at the same time the rotation can in particular preferably take place about the first axis of the two gripping adapters independently of one another, synchronously or asynchronously, with different or identical rotational speed. In an especially simple and practical manner, i.e. in a compact manner and with great relative mobility, the displacement axis of the mounting slides is preferably arranged parallel to the X direction of the milling spindle. In order to be able to again machine, in particular, large blades as mentioned above, it should be possible for the mounting slides to be displaced on the base unit along the first axis by in each case+ respectively−130 to 170 mm (with regard to the left-hand and right-hand mounting slides, respectively) and by in each case− respectively +1100 to 1600 mm (with regard to the left-hand and right-hand mounting slides, respectively), and the rotation about the first axis should be designed to be endless.

A further preferred embodiment of the present machine tool or milling machine is characterized in that the at least one special gripping adapter is designed in such a way that it can automatically grip the workpiece partly machined in the gripping adapters, and in that the at least one mounting slide can be displaced out of the machining region of the milling spindle, the at least one special gripping adapter preferably being fastened to at least one rocker which is rotatable about a second axis and which in turn is arranged on a rocker slide unit, which is displaceable along a third axis and is mounted so as to be rotatable about this third axis, the rocker also being displaceable perpendicularly to this third axis. As already mentioned above, the rotatability about the second axis in the presence of two rockers is advantageously designed independently of one another, so that the workpiece can also be restrained for the second machining step by slight contra-rotation. With regard to the arrangement of the axis relative to one another, it may be mentioned that the second axis of the rocker is advantageously arranged parallel to the X direction of the milling spindle and/or that the third axis is arranged parallel to the X direction of the milling spindle. In order to be able to machine, for example, large blades as mentioned above, the rocker should be rotatable about the second axis by +/−50 to 60 degrees, the rocker slide units should be displaceable along the third axis by + respectively−1200 to 1800 mm and by − respectively+80 to 120 mm (with regard to the left-hand and right-hand rocker slide units, respectively) and should be rotatable about this axis by +50 to 60 degrees, and the rocker should be displaceable perpendicularly to the third axis by −50 to 60 mm respectively+140 to 150 mm.

Further preferred embodiments of the machine tool or milling machine according to the invention are described in the dependent patent claims.

The present invention also relates to the use of an apparatus or a method as described above for producing a guide or moving blade or a turbine blade, in particular a turbine blade with or without a shroud band, having a surface within the range of N4 to N5 with tolerances of +/−0.002 mm, a length within the range of 120 to 2400 mm, with a rotating diameter of 50 to 400 mm, and a weight of 10 to 400 kg.

BRIEF DESCRIPTION OF THE DRAWINGS

The invention is to be explained in more detail below with reference to exemplary embodiments and in connection with the figures. In the drawing.

DETAILED DESCRIPTION OF THE PREFERRED EMBODIMENTS

Figure 1:
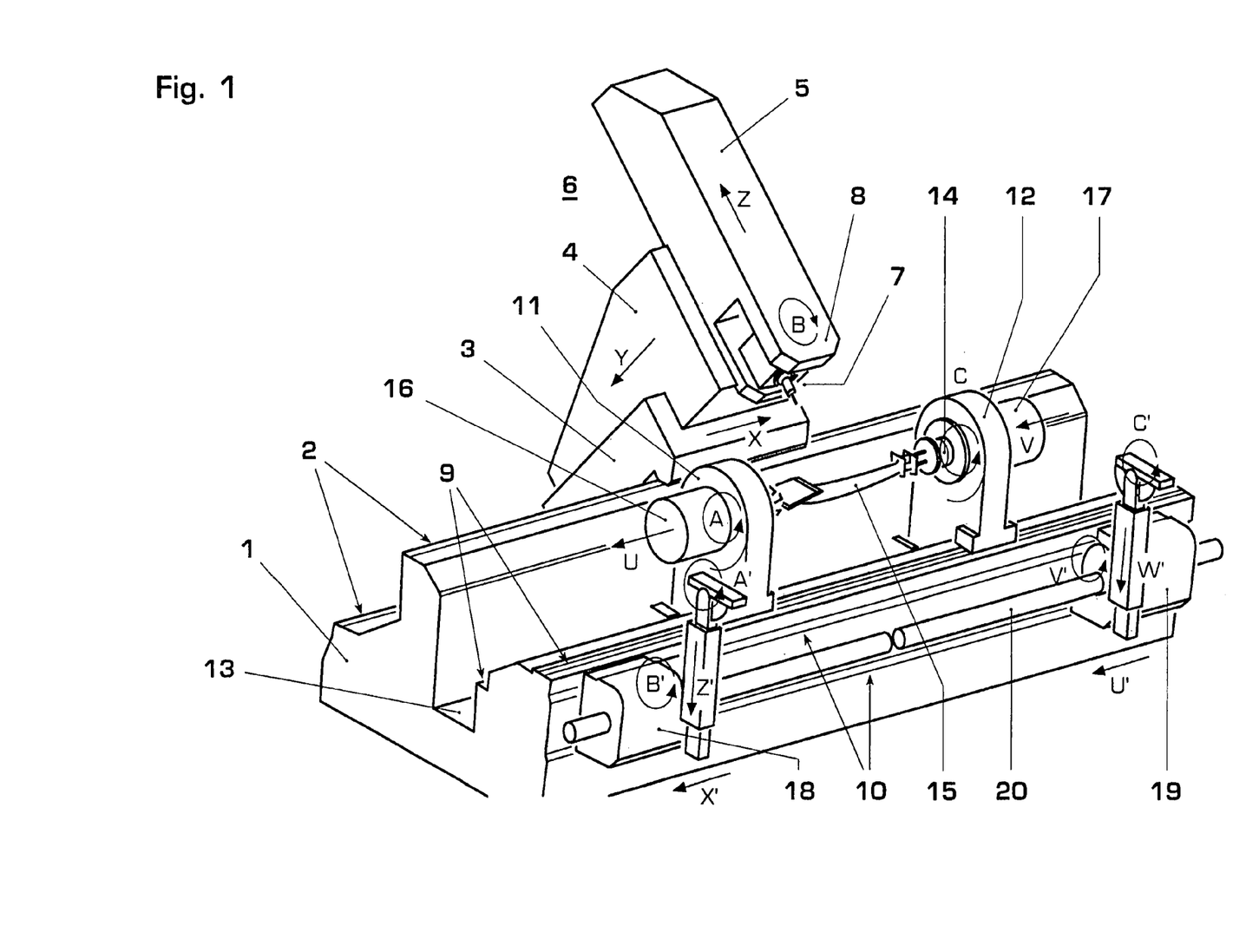
FIG. 1 shows a milling machine with 21 axes in a perspective view.
Figure 2:
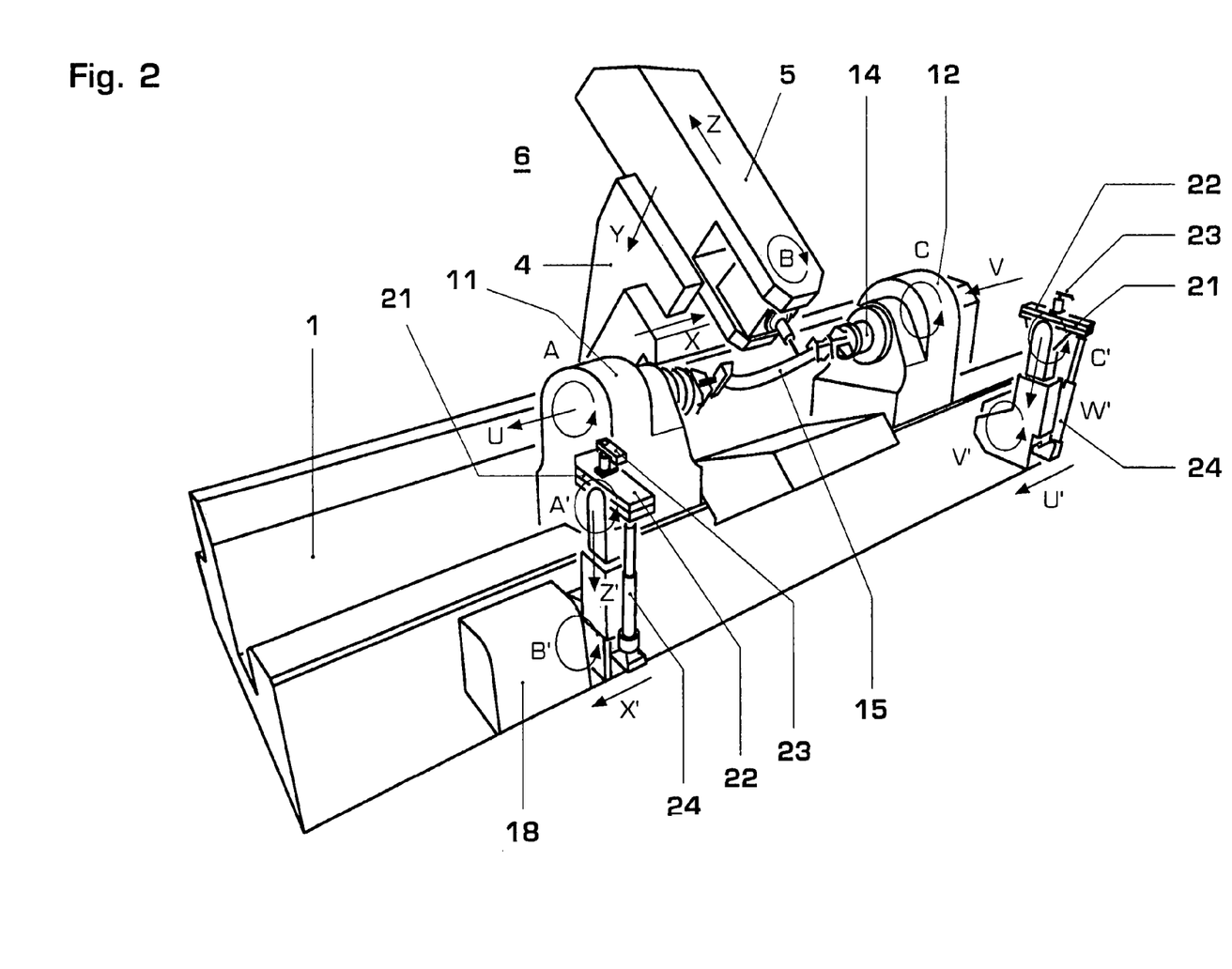
FIG. 2 shows a further view of the milling machine according to FIG. 1 with the rockers shown in detail.

FIGS. 1 and 2 show a blade milling machine in perspective view. The milling machine has a base frame 1 on which the individual elements are mounted. The two guideways 2 for the base slide unit 3 of the UNI milling spindle 7 are provided at a defined angle on the rear side of the base frame 1. The two guideways 9 for the A-axis slides 11 and 12 are provided in the center region. The guideways 10 for the two rockers 21 are provided at the front. The chip passage 13 is integrated between the guideways 2 and 9. The chip passage 13 has been transversely ribbed in order to ensure that the frame is not weakened. The Y slide unit 4 of the UNI milling spindle 7, with which the Y stroke (Y) of the spindle is carried out, is mounted on the base slide unit 3 of the UNI milling spindle 7, which carries out the X stroke (X) of the spindle. The Z ram 5 is mounted on the Y slide 4 at an angle of 90 degrees to the Y stroke. The spindle carries out the Z stroke (Z) by means of said Z ram 5. The UNI spindle 7 itself is mounted in a rotary axis 8, with which it can be swiveled by +/−110 degrees.

For pure turning work, a fixed tool-mounting system, such as an HSK interface for example, is provided in the flange part of the high-speed spindle. With the two blade rotation axes 16 and 17 of the two mounting slides 11 and 12 about the axes A and C, respectively, the clamped blades can be run in both turning operation and NC operation. They form the two blade rotation axes A and C. To accommodate gripping adapters, these rotation axes are designed with a standard HSK interface. The two blade rotation axes 16 and 17 are mounted on the two rotation linear slides 11 and 12, by means of which they can perform the linear movements U and V.

If required, the two NC linear axes U and V can be operated as GANTRY axes. For higher feed rates, the X linear axis of the milling spindle 6 is operated in opposition to the two NC linear axes U and V in order to both halve the acceleration slopes and double the maximum milling speed.

The UNI motor spindle itself is integrated in a rotary axis 8 and fixed by quick-clamping systems. The energy and signal transmission from the machine to the UNI motor spindle 7 is effected via a "plug-in interface".

Mounted on the end face are the two rocker slide units 18 and 19, which perform the two linear movements X' and U'. Mounted on said rocker slide units 18 and 19 are the plunger tilting axes B' and V', which can tilt the plunger and thus the rocker 21 with their special gripping adapters 22 into the desired position. The two plungers perform the linear movements Z' and W' about the correct extension points.

Mounted on the plungers are the two NC rockers 21, which perform the rotary and setting movements A' and C', respectively.

Figure 7:
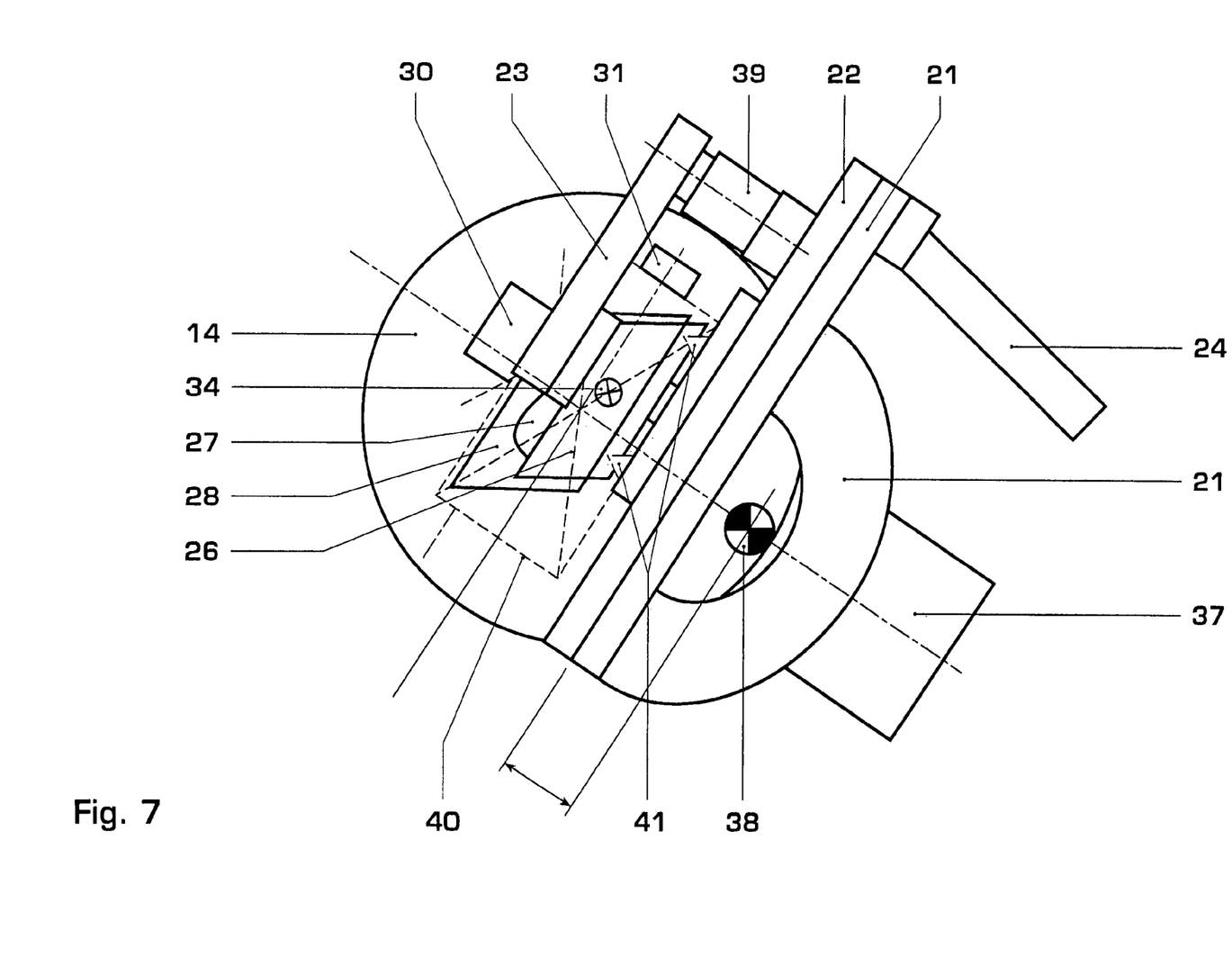
FIG. 7 shows a side view of a partly completed blade clamped in place on the NC rocker.

Mounted on said NC rockers 21 are the two special gripping adapters 22 which are intended for accommodating the partly finish-milled blades in the finished regions and clamp in a hydraulic manner (cf., in this respect, in particular FIG. 7).

To change the special gripping adapters 22, they can each be moved to the right and left toward the end of the base frame into the protected region. Here, exchange can be effected in parallel with the machining time.

Figure 3:
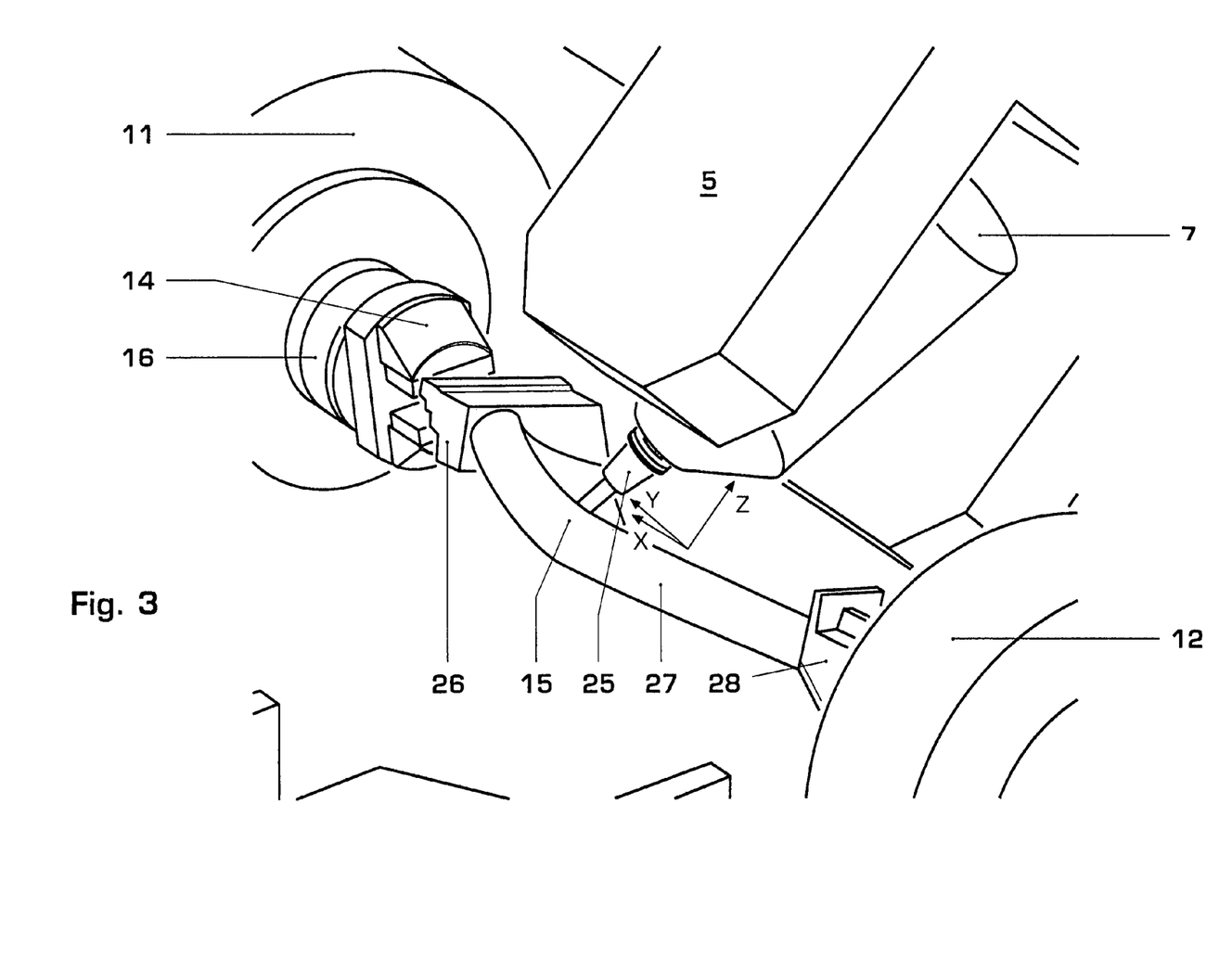
FIG. 3 shows a detailed view of the milling machine according to FIG. 1 of the machining region with a workpiece (turbine blade with special adapter for cast or forged blades) clamped in place in mounting slides.

FIG. 3 shows a detail of the machining region of the milling machine when the first machining step is being carried out. Here, it can be seen how the blank is gripped by the two adapters 14 at both ends, using a shaped gripping adapter, and how as far as possible the entire region arranged between the two holding points is machined via the cutting tool 25.

Figure 4:
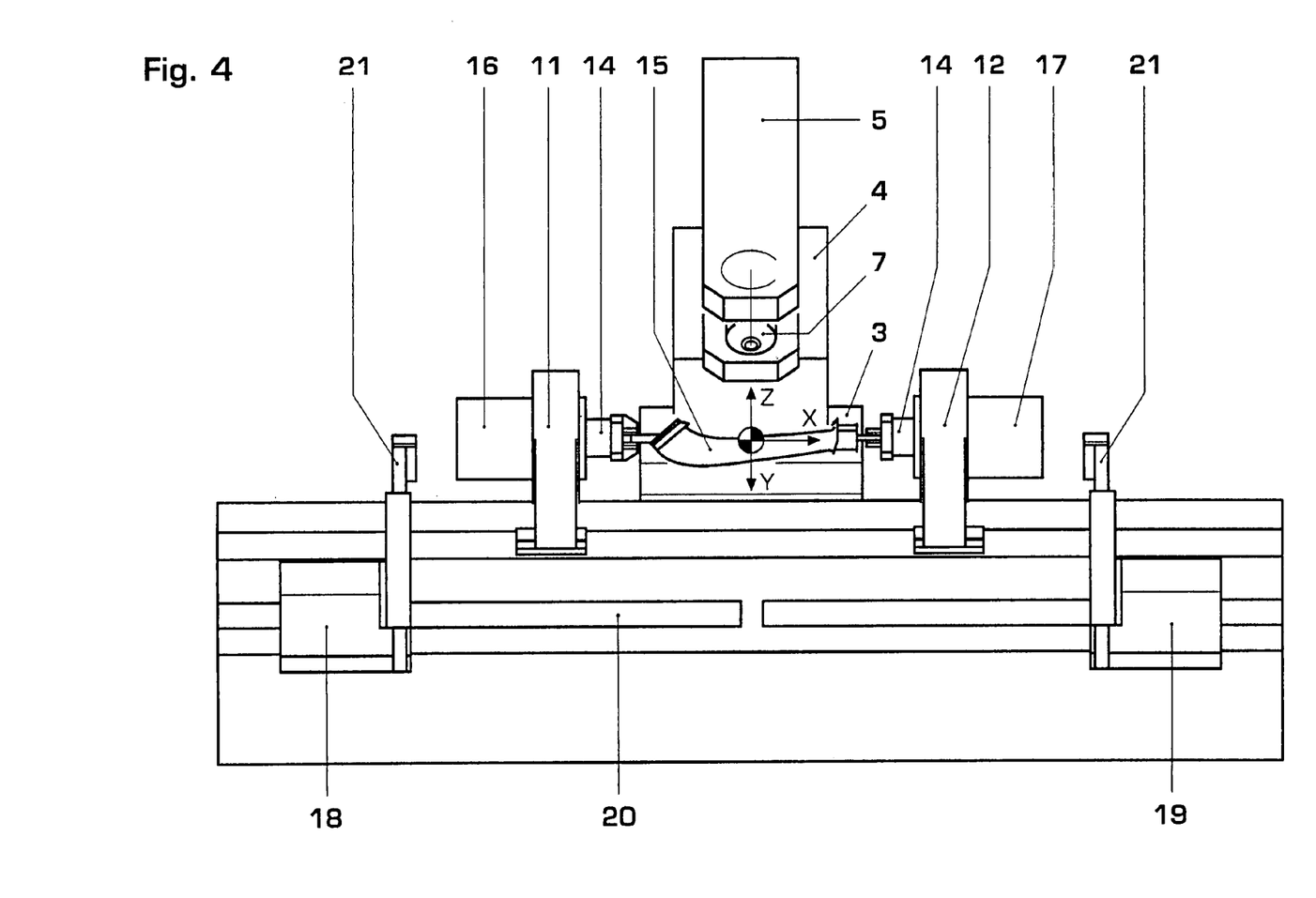
FIG. 4 shows a view of the milling machine according to FIG. 1 with positioning at the machine zero point.

FIG. 4 shows the position of the machine at the machine zero point, relative to which the following deflections of the individual slides and units are provided. This for two different types of machine—a small variant (HSTM800) and a large variant (HSTM2000).

In this case, the values for the main axes are as follows:

| Axis | HSTM800 | HSTM2000 |
| --- | --- | --- |
| X | +/−1050 mm | +/−1200 mm |
| Y | +/−310 mm | +/−310 mm |
| Z | +910 mm | +910 mm |
|   | −100 mm | −100 mm |
| U | +150 mm | +150 mm |
|   | −1100 mm | −1550 mm |
| V | −150 mm | −150 mm |
|   | +1100 mm | +1550 mm |
| A/C | endless | endless |
| B | +/−95 degrees | +/−95 degrees |

The values for the superimposed device with the rockers 21 are as follows:

| Axis | HSTM800 | HSTM2000 |
| --- | --- | --- |
| Left-hand rocker | | |
| X' | +1260 mm | +1700 mm |
|    | −100 mm | −100 mm |
| Z' | −55 mm | −55 mm |
|    | +145 mm | +145 mm |
| B' | 0 | 0 |
|    | +50 degrees | +50 degrees |
| A' | +/−55 degrees | +/−55 degrees |
| Right-hand rocker | | |
| U' | −1260 mm | −1700 mm |
|    | +100 mm | +100 mm |
| W' | −55 mm | −55 mm |
|    | +145 mm | +145 mm |
| V' | 0 | 0 |
|    | +50 degrees | +50 degrees |
| C' | +/−55 degrees | +/−55 degrees |

For the displacement dimensions specified above, such a milling machine has a size of 6×9×4.5 m.

Figure 5:
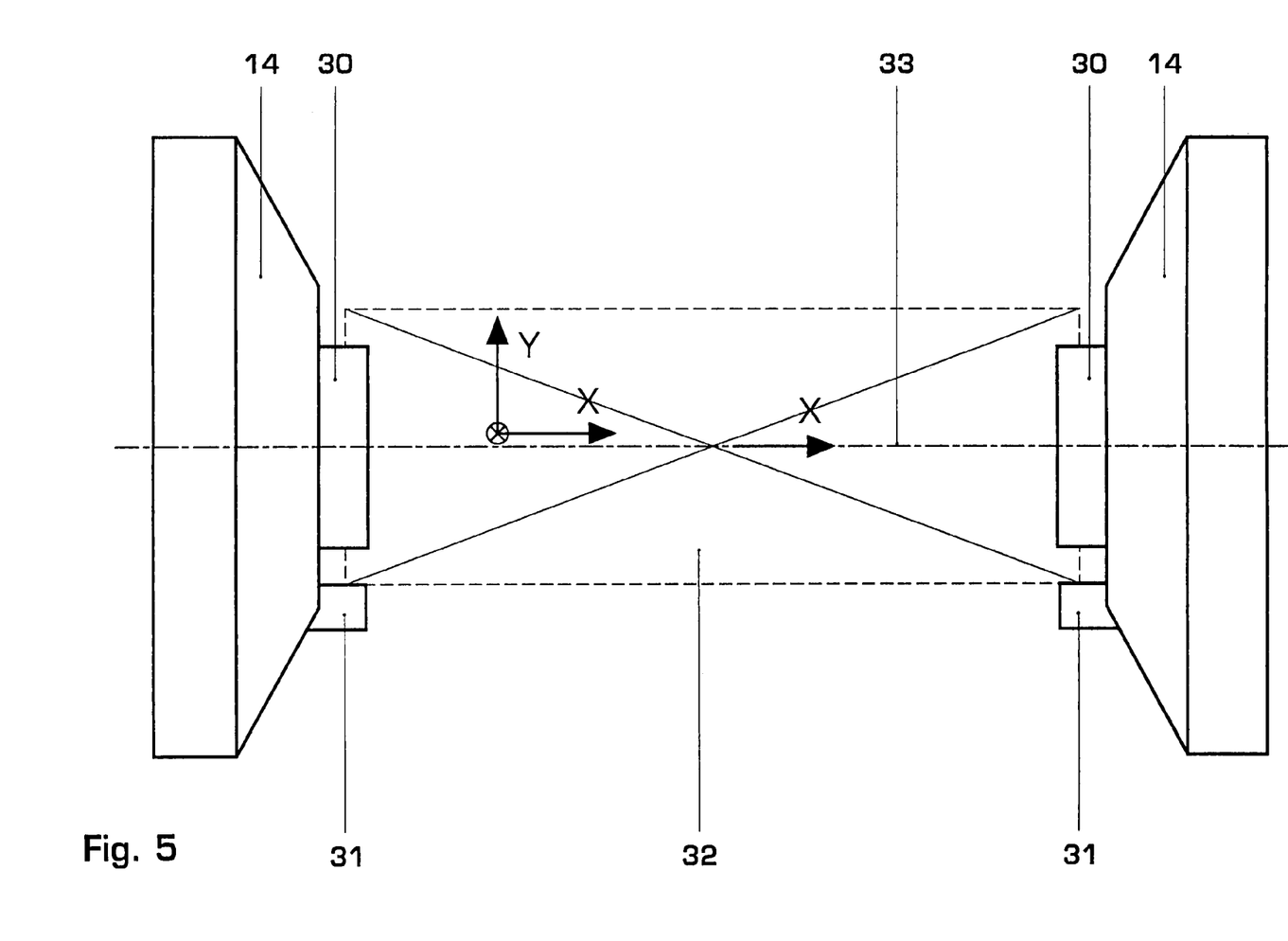
FIG. 5 shows a view of a blank clamped in place.
Figure 6:
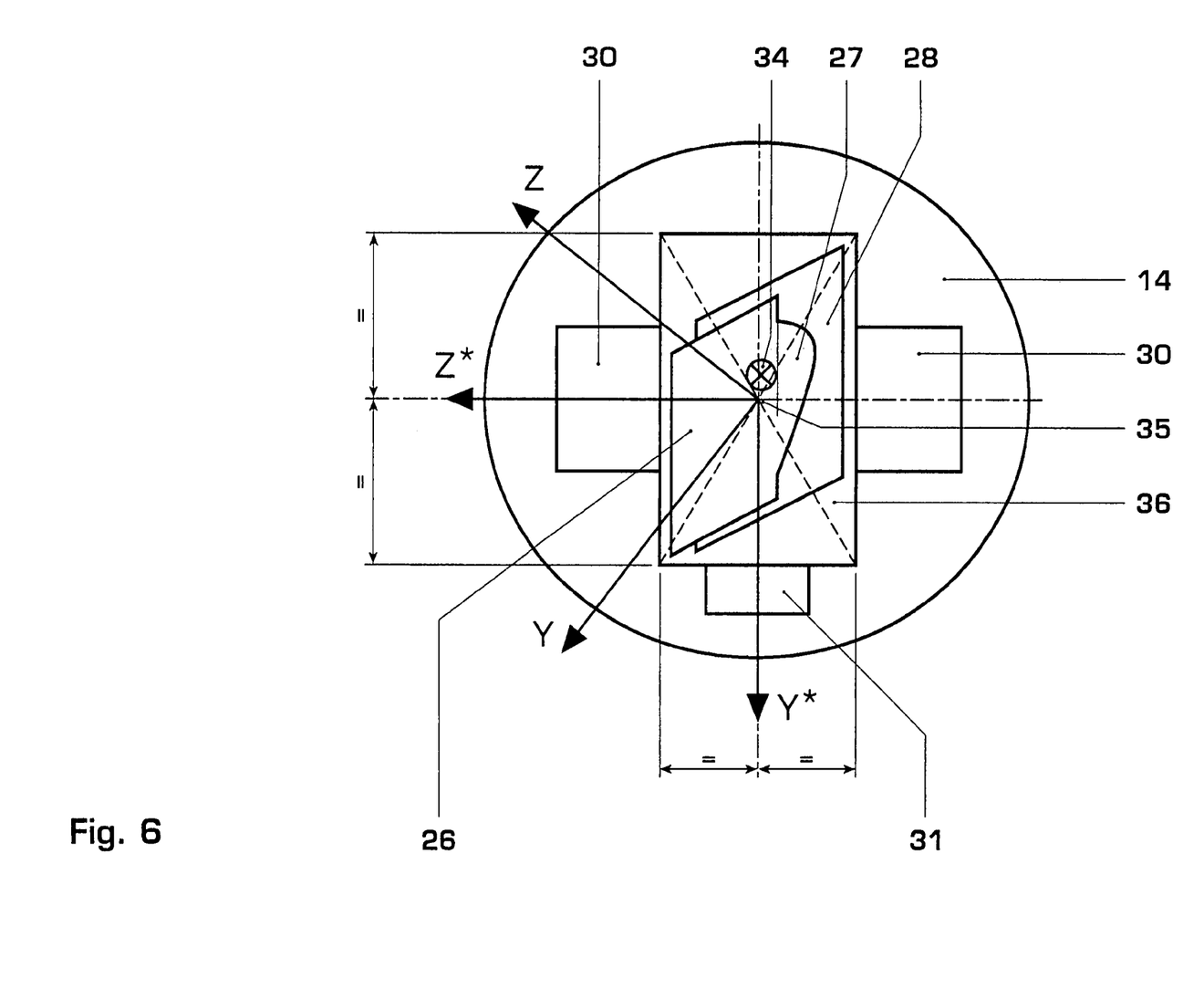
FIG. 6 shows a side view of a partly completed blade clamped in place in the gripping adapter.

The method of machining a blank from all directions using a machine as has just been described above is now to be shown. In this case, by way of example, the overall shape to be achieved involves a turbine blade. Here, FIGS. 5 to 7 show individual sections of the production method.

The following shapes and materials are used as raw material: bars (rectangular shape, round or any other desired cross section), forged or cast blanks, provided with material code for quality assurance (digits, letter code laser-cut, punched or rotationally stamped).

In this case, the overall shape to be achieved has the following qualities:

| Blade qualities: | surface | N4–N5 |
| --- | --- | --- |
|  | tolerances | ±0.002 mm |
| Sizes: | length | >120 mm |
|  |  | <2400 mm |
|  | rotating diameter | >50 mm |
|  |  | <800 mm |
|  | weight | >10 kg |
|  |  | <400 kg |

Loading and unloading of the HSTM machine:

To this end, a blank 32 of any desired shape is brought manually and/or by means of a handling system into the blade milling machine, which may also be in a flexible cell, and is brought out again by the same transport systems after the machining. In this case, the method is to be demonstrated with the aid of two different blanks; on the one hand using a blank 32 in the form of a raw material bar (point 1 of the sequence of method steps specified below), and on the other hand using a blank 32 in the form of a cast or forged blade (point 2 of the sequence of method steps specified below). When a raw material bar is used, it is clamped directly in place by means of a robot, whereas in the case of complex parts, such as cast or forged blades for example, the blank 32 is preferably first of all clamped in place in an adapter, and then the blank together with the adapter is inserted into the machine by means of a robot. The actual machining of such a blank 32 is then described with reference to point 3.

1) Blank 32 in the Form of a Raw Material Bar
   1.1) The raw material bar is placed on a loading belt or ramp, with which it passes to the handling system at a transfer location.
   1.2) Here, the raw material bar is oriented for the defined transfer.
   1.3) Here, the raw material bar is clamped with a gripper and is brought to a material-code-reading station by means of the handling system.
   1.4) The material code is read and signaled to the production control system.
   1.5) In this way, the raw material bar is recorded in a clearly defined manner and assigned a production number.
   1.6) After that, the raw material bar is transported to the milling machine (HSTM) by means of the handling system.
   1.7) The raw material bar is then brought into the machine to the transfer or gripping position between the two A axes (NC rotation axes 16 and 17).
   1.8) By traverse of the handling system in the direction of the A axis 16 or 17 and/or by the traverse of the two NC linear axes 11, 12, on which the axes 16, 17 are mounted, the raw material bar passes into the raw-material-bar gripping adapters or adapter 14. After the gripping of the raw-material-bar gripping adapter 14 (accurate positioning, e.g. via a stop 31 and fixing via clamping jaws 30), the handling system leaves the machine working space and assumes other tasks in the FMS (FIGS. 5 and 6).
   1.10) The actual production steps (item 3 further below) start.

2) Blank 32 in the Form of a Cast or Forged Blade
   2.1) In the case of the forged and cast blades, a shaped gripping adapter 14 engaging on the root and/or tip of the blade is clamped outside the cell on a specially designated gripping surface on an adjusting and gripping device, on which the blades are centrally oriented. The blade, with shaped gripping adapter 14 on one side or on both sides, is then fed into the pallet station onto a gripping pallet.
   2.1) The loaded pallet is then fed into the pallet station.
   2.2) To remove a blade (GSS) gripped in the shaped gripping adapters, said blade must be brought to the handling system at the transfer location.
   2.3) Here, before removal of the GSS, its material code is read and transmitted to the production control system.
   2.4) For further clearly defined identification of this blade, a chip is inscribed by a writing system and is provided in one of the shaped gripping adapters 14.
   2.5) In this way, the GSS is recorded in a clearly defined manner and assigned a production number.
   2.6) After that, the GSS is gripped by the gripper of the handling system and is brought by the latter to the milling machine (HSTM) (cf., in this respect, FIG. 3, in which the gripping adapter 14 is shown as a shaped gripping adapter for a GSS).
   2.7) The GSS is then brought into the machine to the transfer or gripping position between the two A axes (NC rotation axes 11, 12).
   2.8) By traverse of the handling system in the direction of an A axis and/or by the traverse of the two NC linear axes 11, 12, the shaped gripping adapters or adapter 14 are/is fixed and clamped in the A axis or axes.
   2.9) After the gripping of the shaped gripping adapters 14, the handling system leaves the machine working space and assumes other tasks in the FMS (FIGS. 5 and 6).
   2.10) The actual production steps (item 3 further below) start.

The blank 32 is now gripped via the two gripping adapters 14 between the two mounting slides 11, 12 or, in the case of support on one side, by only one mounting slide, as shown in FIGS. 5 and 6. In this case, as can be seen in FIG. 6, the center of gravity 35 of the blank, which normally lies on the rotation axis 33 of the mounting slides 11, 12, and the blade rotary center 34 are not usually superimposed.

3) Actual Production Steps in the Milling Machine
   3.1) In the first step, during the first machining step in the first setup, all the roughing operations in the rhombus, duct and tip region of the gripped blade, except for a defined allowance for the end contour of the blade, are carried out. This operation can be carried out by conventional milling or by helical roughing. To this end, the roughing tools are clamped in place in the UNI motor spindle 7 by means of an integrated tool changer. The rough milling itself is effected by means of an NC program.
   3.2) In the second step, during the first machining step, using the "semi-finishing tools", the already clamped, rough-milled blade is given a constant allowance (plus 0.2 to 1.2 mm) relative to the final contour by spiral (helical) and linear milling. The allowance is dependent on the type of blade. In various blade types, this step 3.2 may also be omitted.
   3.3) In the third step, during the first machining step, using the "finishing tools", the complete blade channel is given the desired contour and surface quality by spiral milling (helical milling).
   3.4) In the fourth step, during the first machining step, the rhombic surfaces at the tip and root, including the blade-suspension and sealing parts, are then produced, i.e. the functional surfaces of the root geometry (H root, etc.) are already produced in this step.
   3.5) After that, still in the first setup, the turbine blade is measured by means of a position- or contour-measuring system (probe or laser measuring systems). The measuring data are processed for the documentation and, if necessary, correction data are prepared for the next turbine blade production and are transmitted to the controller and to the control system for including in the corresponding NC program.

After this operation, the blade is finished except for the two end faces at the tip and root and the first machining step has been completed.

3.6) In order to be able to machine these two end faces, the rhombic position of the blade is brought by the two A rotation axes 16, 17 and linear axes U, V into a defined transfer position (rotary angle of the A axis).

For the transfer itself, the two rockers 21 are brought into this position on the front side of the milling machine. After that, the rockers 21 (cf. FIG. 7) are swung in by their swivel axes B' and V', respectively, and are then extended toward the machine center. Attached to this plunger is a special gripping device 22, with which the blade is then hydraulically gripped in special gripping and locating jaws.

For the precise positioning, the special gripping device 22 can be additionally positioned by an NC tilting axis A' or C', respectively. For the different blade geometries, the special gripping and locating jaws 14 are exchanged outside the working space on the right and left at the front side of the machine in parallel with the machining time. Furthermore, the gripping stroke can be increased by exchanging the extended hydraulic cylinder.

3.7) Once the blades are then clamped in the two special gripping devices 22, the two shaped gripping adapters 14 are released and the A axes 11, 12 are brought to the right and left on the outside into "parking positions". This is necessary in order to avoid a subsequent collision with the milling spindle 7 and with the axes Y, Z and B.

3.8) For the actual machining of the end faces of the root and tip, especially in the case of long blades, the two rockers 21 are moved to the right or left in order to obtain sufficient clearance space for the UNI spindle 7, etc.

3.9) By introducing the requisite tools as replacements into the UNI spindle 7, these two faces are then finish-milled, if need be, by rotating the B axis of the motor spindle through 90 degrees.

3.10) The position may be checked if required.

3.11) After the flushing process, which removes all the contaminants from the blade, one or more position- or contour-measuring systems (probe or laser measuring systems) are clamped in place in the UNI motor spindle 7. Furthermore, a surface-quality measuring system can be exchanged here. The blade is then measured with these devices. The measuring data are processed in the operating computer in order to be able to carry out, if appropriate, correction machining. Furthermore, the quality documentation is prepared here.

The second machining step in the second setup has thus been completed.

3.12) The blade is then tilted toward the handling system by lifting the rocker 21 to the transfer station.

3.13) After that, the blade, by means of the same handling system, if need be after previous gripper exchange, is brought to the inscription station in order to provide it with a clearly defined code (usually a numerical code) here.

3.14) After this inscription, the blade passes into the washing and preserving machine, from which it is then discharged.

List of Designations

1 Base frame
2 Rear guideways
3 Base slide unit (X direction of the milling spindle)
4 Y slide unit of the milling spindle
5 Z slide unit of the milling spindle
6 Milling spindle
7 UNI spindle
8 Rotary axis of 7
9 Guideways for the mounting slides
10 Guideways for the two rockers
11 Left-hand mounting slide
12 Right-hand mounting slide
13 Chip passage
14 Gripping adapter
15 Workpiece
16 Left-hand blade rotation axis
17 Right-hand blade rotation axis
18 Left-hand rocker slide unit
19 Right-hand rocker slide unit
20 Rotary guide
21 NC rocker
22 Special gripping adapter
23 Gripping arm of 22
24 Adjusting cylinder for 21
25 Cutting tool
26 Tip of the blade
27 Airfoil region of the blade
28 Root of the blade
30 Clamping jaw of 14
31 Stop for blank
32 Blank
33 A axis and C axis, respectively, of mounting slides
34 Blade rotary center
35 Center of gravity of the blank
36 Flat material, projecting portion
37 Guide cylinder of 21
38 Rotation axis of 21 (A' or C' axis)
39 Adjusting cylinder of 23
40 Contour line of the blank
41 Fixing lugs of 22

What is claimed is:

1. A method of milling a blank from all directions using at least one machine tool, the method comprising:
    a first machining step in which the blank is held by at least one gripping adapter and a first region is given a final partial shape by the machine tool, with the final partial shape corresponding to an intended use; and
    a second machining step in which the partly machined blank is held in the first region by at least one special gripping adapter, and a remaining region is given a final overall shape by the machine tool corresponding to the intended use;
    wherein the first machining step leaves unmachined projecting portions on the final partial shape at a tip part and a root part.

2. The method of claim 1, wherein:
    the blank is made of a material selected from the group consisting of metal and ceramic; and
    the blank has a shape selected from the group consisting of rectangular, cylindrical, and polyhedral.

3. The method of claim 2, wherein the blank has a parallelepiped shape.

4. The method of claim 2, wherein the blank is cast.

5. The method of claim 2, wherein the blank is forged.

6. The method of claim 2, wherein the blank has not been subjected to a pre-machining step.

7. A machine tool for milling a blank from all directions using a method comprising a first machining step in which the blank is held by at least one gripping adapter and a first region is given a final partial shape by the machine tool, with the final partial shape corresponding to an intended use, and a second machining step in which the partly machined blank is held in the first region by at least one special gripping adapter, and a remaining region is given a final overall shape by the machine tool corresponding to the intended use, the machine tool comprising:
- a milling spindle that is displaceable in three spatial directions and with which the blank can be machined in a machining region;
- at least one mounting slide comprising gripping adapters with which the blank can be mounted for the first machining step;
- at least one rocker comprising at least one special gripping adapter with which the partly machined blank can be mounted in the first region for the second machining step.

8. A method of milling a blank from all directions using at least one machine tool, the method comprising:
- a first machining step in which the blank is held by at least one gripping adapter and a first region is given a final partial shape by the machine tool, with the final partial shape corresponding to an intended use; and
- a second machining step in which the partly machined blank is held in the first region by at least one special gripping adapter, and a remaining region is given a final overall shape by the machine tool corresponding to the intended use;
- wherein the final overall shape is selected from the group consisting of a turbine blade, a guide blade, and a moving blade; and
- wherein the final partial shape comprises a tip of the blade, an airfoil region of the blade and a root of the blade.

9. The machine tool of claim 7, wherein the machine tool is configured as a milling machine.

10. The method of claim 8, wherein:
projecting portions gripped by the gripping adapter are left at the tip and at the root after the first machining step, the projecting portions then being removed in the second machining step.

11. The method of claim 1, wherein the blank, in both machining steps, is machined by a single milling spindle displaceable in three spatial directions and carrying a rotatable spindle for mounting a cutting tool.

12. A method of milling a blank from all directions using at least one machine tool, the method comprising:
- a first machining step in which the blank is held by at least one gripping adapter and a first region is given a final partial shape by the machine tool, with the final partial shape corresponding to an intended use; and
- a second machining step in which the partly machined blank is held in the first region by at least one special gripping adapter, and a remaining region is given a final overall shape by the machine tool corresponding to the intended use;
- wherein in the first machining step the blank is held in two gripping adapters that grip the blank at a tip and a root thereof, and the first region is processed in an exposed portion between the two gripping adapters.

13. The method of claim 12, wherein:
the gripping adapters are guided by two mounting slides in such a way that the blank, with respect to a milling spindle machining the blank, is displaceable along a first axis and rotatable about the first axis.

14. The method of claim 13, wherein:
the rotation takes place about the first axis of the two gripping adapters independently of one another, synchronously, with different rotational speeds.

15. The method of claim 13, wherein:
the rotation takes place about the first axis of the two gripping adapters independently of one another, synchronously, with identical rotational speeds.

16. The method of claim 13, wherein:
the rotation takes place about the first axis of the two gripping adapters independently of one another, asynchronously, with different rotational speeds.

17. The method of claim 13, wherein:
the rotation takes place about the first axis of the two gripping adapters independently of one another, asynchronously, with identical rotational speeds.

18. A method of milling a blank from all directions using at least one machine tool, the method comprising:
- a first machining step in which the blank is held by at least one gripping adapter and a first region is given a final partial shape by the machine tool, with the final partial shape corresponding to an intended use; and
- a second machining step in which the partly machined blank is held in the first region by at least one special gripping adapter, and a remaining region is given a final overall shape by the machine tool corresponding to the intended use;
- wherein after the first machining step with a milling spindle, the partly machined blank is automatically gripped by the at least one special gripping adapter in the first region, the at least one gripping adapter is released and moved out of a working region of the milling spindle, and the partly machined blank, while being mounted in the special gripping adapter, is given the final overall shape with the same milling spindle; and
- wherein the at least one special gripping adapter is fastened to at least one rocker that is rotatable about a second axis and that in turn is arranged on a rocker slide unit displaceable along a third axis and mounted so as to be rotatable about the third axis, with the rocker also being displaceable perpendicularly to the third axis.

19. The machine tool of claim 7, wherein the milling spindle comprises a base slide unit displaceable in an X direction on rear guideways arranged on a base frame, a Y slide unit displaceable on the base slide unit in a Y direction, a Z slide unit displaceable on the Y slide unit in a Z direction, and a UNI spindle rotatable about a rotary axis in the Z slide unit and carrying a cutting tool.

20. The method of claim 1, wherein the final overall shape is cleaned after the second machining step.

21. The method of claim 1, wherein the final overall shape is measured after the second machining step.

22. The method of claim 1, wherein the final overall shape is packed after the second machining step.

23. The method of claim 1, wherein:
the final overall shape is selected from the group consisting of a guide blade and a turbine blade;
the blade comprises a shroud band; and
the blade has a surface within the range of N4 to N5 at tolerances of +/−0.002 mm, a length within a range of 120 to 2400 mm with a rotating diameter of 50 to 400 mm, and a weight of 10 to 400 kg.

24. The method of claim 1, wherein:
   the final overall shape is selected from the group consisting of a guide blade and a turbine blade;
   the blade does not include a shroud band; and
   the blade has a surface within the range of N4 to N5 at tolerances of +/−0.002 mm, a length within a range of 120 to 2400 mm with a rotating diameter of 50 to 400 mm, and a weight of 10 to 400 kg.

25. The machine tool of claim 19, wherein the at least one special gripping adapter is configured to automatically grip the partly machined blank, and the at least one mounting slide is displaceable out of a machining region of the milling spindle.

26. The machine tool of claim 25, wherein the at least one special gripping adapter is fastened to at least one rocker which is rotatable about a second axis and which in turn is arranged on a rocker slide unit, which is displaceable along a third axis and is mounted so as to be rotatable about the third axis, the rocker being displaceable perpendicularly to the third axis.

27. The machine tool of claim 19, wherein the milling spindle is displaceable in the X direction by +/−1000 to 1200 mm and in the Y direction by +/−300 to 350 mm and in the 7 direction by +900 to 1000 and −90 to 110 mm, relative to a zero point of the machine tool.

28. The machine tool of claim 27, wherein the UNI spindle is rotatable by +/−90 to 100 degrees about the rotary axis.

29. The machine tool of claim 19, wherein two mounting slides are arranged so that the blank is held in the first machining step in two gripping adapters that grip the blank at a tip and a root thereof.

30. The machine tool of claim 29, wherein the gripping adapters are guided by The two mounting slides in such a way that the blank, wit respect to the milling spindle machining the blank, is displaceable along a first axis and rotatable about the first axis.

31. The machine tool of claim 30, wherein:
   the rotation takes place about the first axis of the two gripping adapters independently of one another, synchronously, with different rotational speeds.

32. The machine tool of claim 30, wherein:
   the rotation takes place about the first axis of the two gripping adapters independently of one another, synchronously, wit identical rotational speeds.

33. The machine tool of claim 30, wherein:
   the rotation takes place about the first axis of the two gripping adapters independently of one another, asynchronously, with different rotational speeds.

34. The machine tool of claim 30, wherein:
   the rotation takes place about the first axis of the two gripping adapters independently of one another, asynchronously, with identical rotational speeds.

35. The machine tool of claim 30, wherein:
   the displacement axis of the mounting slides is arranged parallel to the X direction of the milling spindle.

36. The machine tool of claim 30, wherein the mounting slides are displaceable on the base slide unit along the first axis by in each case+ respectively−130 to 170 mm and by in each case− respectively+1100 to 1600 mm, relative to a zero point of the machine tool, and rotation about the first axis is configured to be endless.

37. The machine tool of claim 26, wherein the second axis of the rocker is arranged parallel to the X direction of the milling spindle.

38. The machine tool of claim 26, wherein the third axis is arranged parallel to the X direction of the milling spindle.

39. The machine tool of claim 26, wherein the rocker is rotatable about the second axis by +/−50 to 60 degrees, the rocker slide units are displaceable along the third axis by −respectively−1200 to 1800 mm and by −respectively+80 to 120 mm, relative to a zero point of the machine tool, and are rotatable about the third axis by +50 to 60 degrees, relative to the zero point of the machine tool, and the rocker is displaceable perpendicularly to the third axis by −50 to 60 mm respectively +140 to 150 mm, relative to the zero point of the machine tool.

* * * * *

UNITED STATES PATENT AND TRADEMARK OFFICE
CERTIFICATE OF CORRECTION

PATENT NO.        : 7,261,500 B2  
APPLICATION NO. : 10/902117  
DATED             : August 28, 2007  
INVENTOR(S)       : Killer et al.

It is certified that error appears in the above-identified patent and that said Letters Patent is hereby corrected as shown below:

In claim 30, Col. 15, line 34, replace "The" with --the--, and in Col. 15, line 35, change "wit" to --with--.

In claim 32, Col. 16, line 4, change "wit" to --with--.

In claim 36, Col. 16, lines 20-21, replace "case+ respectively-130 to 170 mm and by in each case- respectively+1100" with --case + respectively - 130 to 170 mm and by in each case - respectively + 1100--.

In claim 39, Col. 16, lines 32-38, replace "third axis by - respectively-1200 to 1800 mm and by -respectively+80 to 120 mm, relative to a zero point of the machine tool, and are rotatable about the third axis by +50 to 60 degrees, relative to the zero point of the machine tool, and the rocker is displaceable perpendicularly to the third axis by -50 to 60 mm respectively +140 to 150 mm" with --third axis by + respectively - 1200 to 1800 mm and by - respectively + 80 to 120 mm, relative to a zero point of the machine tool, and are rotatable about the third axis by + 50 to 60 degrees, relative to the zero point of the machine tool, and the rocker is displaceable perpendicularly to the third axis by - 50 to 60 mm respectively + 140 to 150 mm--.

Signed and Sealed this

Twentieth Day of November, 2007

JON W. DUDAS  
*Director of the United States Patent and Trademark Office*